United States Patent [19]

Arnold

[11] 4,021,409

[45] May 3, 1977

[54] THERMALLY STABLE BENZIMIDAZONAPHTHYRIDINE COMPOSITIONS

[75] Inventor: Fred E. Arnold, Centerville, Ohio

[73] Assignee: The United States of America as represented by the Secretary of the Air Force, Washington, D.C.

[22] Filed: June 19, 1975

[21] Appl. No.: 588,736

[52] U.S. Cl. .............................. 260/47 CP; 260/49; 260/63 N; 260/78 TF; 260/78.41
[51] Int. Cl.$^2$ ..................................... C08G 73/20
[58] Field of Search ............. 260/47 CP, 49, 78 TF, 260/65, 78.4 R, 63 N

[56] References Cited
UNITED STATES PATENTS

| | | |
|---|---|---|
| 3,414,543 | 12/1968 | Paufler .............................. 260/47 |
| 3,681,284 | 8/1972 | Grundschober et al. ............ 260/47 |
| 3,740,410 | 6/1973 | Gerber ............................. 260/295 |
| 3,743,624 | 7/1973 | Arnold et al. ....................... 260/47 |
| 3,792,024 | 2/1974 | Saferstein ........................... 260/78 |
| 3,798,201 | 3/1974 | Saferstein et al. ................... 260/78 |
| 3,925,311 | 12/1975 | Arnold et al. ....................... 260/47 |

*Primary Examiner*—Lester L. Lee
*Attorney, Agent, or Firm*—Joseph E. Rusz; Cedric H. Kuhn

[57] ABSTRACT

Thermally stable benzimidazonaphthyridine polymers are synthesized by the polycondensation of an aromatic tetraamine and 4,4',5,5'-tetracarboxy-8,8'-biquinoline dianhydride. The polymers are useful in high temperature applications such as in the fabrication of plastics, composites, fibrous materials, protective coatings and films.

6 Claims, No Drawings

THERMALLY STABLE BENZIMIDAZONAPHTHYRIDINE COMPOSITIONS

RIGHTS OF THE GOVERNMENT

The invention described herein may be manufactured and used by or for the Government of the United States for all governmental purposes without the payment of any royalty.

FIELD OF THE INVENTION

This invention relates to highly fused, aromatic heterocyclic polymers. In one aspect, it relates to a method for synthesizing the polymers.

BACKGROUND OF THE INVENTION

During the last few years, a great deal of research work has been conducted for the purpose of synthesizing polymer compositions suitable for advanced aircraft and aerospace systems. These applications require polymeric materials possessing superior mechanical properties as well as a high degree of thermal oxidative stability. The most suitable class of nonmetallic materials that fulfill these requirements are the aromatic heterocyclic polymers. The present invention provides a new class of such polymers that are characterized by their great thermal stability.

It is an object of this invention, therefore, to provide improved thermally stable aromatic heterocyclic polymers.

Another object of the invention is to provide a method for synthesizing the polymeric materials of high thermal stability.

Other objects and advantages of the invention will become apparent to those skilled in the art upon consideration of the accompanying disclosure.

SUMMARY OF THE INVENTION

The present invention resides in a thermally stable polymer consisting essentially of repeating units having the following formula:

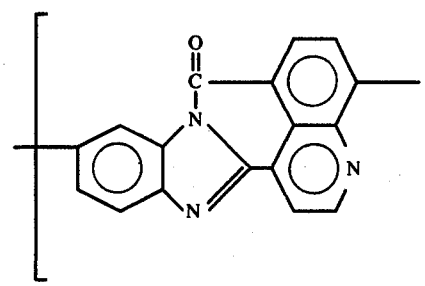

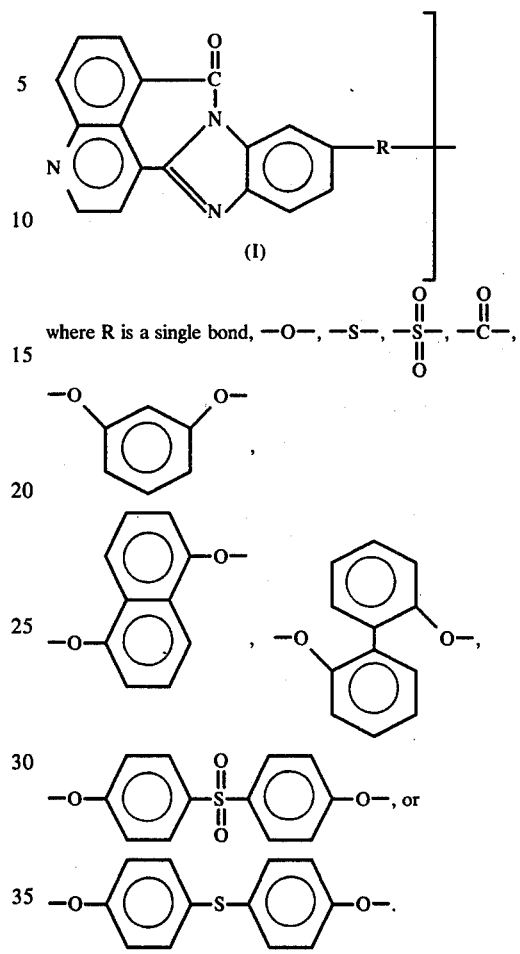

There are usually at least 2 and preferably at least 4 of the repeating units in the polymer. In general, the number of recurring units is such that the polymer has an intrinsic viscosity $[\eta]$ of about 0.10 to 1.5 as determined in methanesulfonic acid.

In one embodiment, the invention resides in a method for preparing the highly fused, aromatic heterocyclic polymers. Thus, the polymers are synthesized by the condensation of an aromatic tetramine with 4,4',5,5'-tetracarboxy-8,8'-biquinoline dianhydride. The condensation reaction involved can be represented by the following equation:

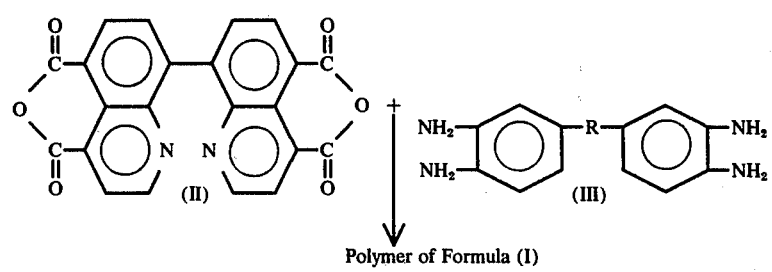

Polymer of Formula (I)

In the above equation R is as indicated hereinabove.

The condensation reaction illustrated by the above equation is conducted under an inert atmosphere in polyphosphoric acid. Any suitable inert gas, such as nitrogen, helium or argon, can be employed. The reaction is usually carried out at a temperature ranging from about 150° to 250° C for a period of about 10 to 30 hours. While a small excess of one of the monomers can be used, equimolar amounts are preferably employed. Besides, in order to prevent the production of low molecular weight products, a considerable excess of one of the monomers should be avoided.

In general, any aromatic tetraamine disclosed in the literature can be used in preparing the polymers of this invention. Exemplary tetraamines include 3,3'-diaminobenzidine, 3,3',4,4'-tetraaminodiphenyl ether, 3,3',4,4'-tetraaminodiphenyl sulfone, 3,3',4,4'-tetraaminodiphenyl sulfide, 3,3',4,4'-tetraaminodiphenyl methane, 3,3',4,4'-tetraaminobenzophenone, 1,3-bis(3,4-diaminophenoxy)benzene, 2,2'-bis(3,4-diaminophenoxy)biphenyl, 1,5'-bis(3,4-diaminophenoxy)naphthalene, 4,4'-bis(3,4-diaminophenoxy)diphenylsulfone, 1,2,4,5-tetraaminobenzene, 1,4,5,8-tetraaminonaphthalene, 1,2,7,6-tetraaminoanthraquinone, 2,3,5,6-tetraaminopyridine, 2,3,7,8-tetraaminodibenzothiophene-5,5-dioxide, 2,3,7,8-tetraaminodibenzofuran, 2,3,7,8-tetraaminophenazine, and the like.

The 4,4',5,5'-tetracarboxy-8,8'-biquinoline dianhydride is prepared by a three-step reaction sequence. Firstly, 2,2'-diamino4,4'-dimethylbiphenyl dihydrochloride is reacted with methylvinyl ketone, thereby forming 4,4',5,5'-tetramethyl-8,8'-biquinoline. The latter compound is then oxidized to the tetraacid which is converted to the dianhydride with acetic anhydride. Complete details for the preparation of the monomer are set forth in Example I.

In the recovery of the polymer product, the reaction mixture is usually cooled, e.g., to room temperature, at the end of the reaction period. The mixture is then poured into a non-solvent for the polymer, such as an alcohol or water, thereby causing the polymer to precipitate from solution. After recovery of the polymer as by filtration or decantation, it is washed with an alcohol and/or water. The washed polymer is then dried, preferably under a vacuum at about 60° to 100° C for a period of about 4 to 12 hours. The foregoing procedure can be repeated one or more times in order to further purify the polymer.

A more complete understanding of the invention can be obtained by referring to the following illustrative examples which are not intended, however, to be unduly limitative of the invention.

EXAMPLE I

Synthesis of 4,4'-5,5'-Tetracarboxy-8,8'-biquinoline Dianhydride a. 4,4',5,5'-Tetramethyl-8,8'-biquinoline.

To a solution of 110 g (0.386 mol) of diaminodimethylbiphenyl dihydrochloride, 418 g (1.55 mol) of ferric chloride hexahydrate, and 10.2 g (0.075 mol) zinc chloride in 500 ml of 95% ethanol heated to 50° C was added 55.6 g (0.78 mol) of methylvinyl ketone over a 90 minute period. The solution was refluxed for 2 hours then allowed to stand over night. Most of the ethanol was removed at reduced pressure and the residue made basic with 25% sodium hydroxide. The basic solution was evaporated to dryness and the dark residue was extracted four times with 400 ml portions of benzene. The extracts were evaporated to dryness to give a dark brown residue. Extraction of the residue with 150 ml of ethanol resulted in a light brown solid which was sublimed (250° C, 0.1 torr) to give 29 g (24%) of 4,4',5,5'-tetramethyl-8,8'-biquinoline, mp 290°–295° C. Crystallization from benzene/hexane afforded an analytical sample, mp 292°–295° C.

Analysis-Calc'd for $C_{22}H_{20}N_2$: C, 84.58; H, 6.45; N, 8.97; Found: C, 84.71; H, 6.50; N, 9.30.

b. 4,4',5,5'-Tetracarboxy-8,8'-biquinoline

A mixture of 18.7 g (60 mmole) of 4,4',5,5'-tetramethyl-8,8'-biquinoline, 100.1 g (336 mmole) of sodium dichromate dihydrate and 500 ml of water was placed in a stirred Parr pressure apparatus. The mixture was heated and stirred for 4 hours at 240° C. The cooled reaction mixture was then filtered to remove chromic oxide, and the green filter cake was washed with 400 ml of hot water. The filtrates were combined and acidified with 6 N hydrochloric acid. After cooling overnight, the precipitate was collected by filtration, washed with water, and dried to give 13.1 g of crude acid. The acid was dissolved in 400 ml of 10% (w/v) potassium hydroxide and treated with 300 ml of 5% (w/v) potassium permanganate solution. After heating the mixture at 70° C for 45 minutes, the excess permanganate was destroyed with ethanol. The maganese dioxide was removed by filtration and acidification of the filtrate with 6 N hydrochloric acid gave a product that contained only one major component by tlc. The acid was redissolved in 400 ml of 10% (w/v) potassium hydroxide. The solution was treated with activated carbon and filtered, and the filtrate acidified with 6 N hydrochlorid acid. The light tan solid was collected by filtration, washed with water and dried in vacuo to give 12.7 g of tetraacid.

Analysis-Calc'd for $C_{22}H_{12}N_2O_8$: C, 61.12; H, 2.80; N, 6.48; Found: C, 58.37; H, 3.03; N, 5.06.

c. 4,4',5,5'-Tetracarboxy-8,8'-biquinoline Dianhydride.

A mixture of 30.0 g (69 mmol) of tetraacid and 400 ml of acetic anhydride was heated to 120° C. A greenish yellow solution was first obtained after which a precipitate formed after about 20 minutes of heating. The mixture was heated for a total of 2 hours, cooled, and the yellow precipitate was collected by filtration, washed with ether, and dried to give 19.5 g (71%), mp darkened 360° C.

Analysis-Calc'd for $C_{22}H_8N_2O_6$: C, 66.07; H, 2.03; N, 7.07; Found: C, 66.59; H, 2.28; N, 6.21.

EXAMPLE II

Poly(7,7'-dioxo[4,4'-bi-7H-benzimidazo[2,1-a]benzo[de][2,6]naphthyridine]-10,10'-diyl)

A mixture of 1.40 g (3.55 mmole) of 4,4',5,5'-tetracarboxy-8,8'-biquinoline dianhydride and 0.761 g (3.55 mmole) of 3,3'-diaminobenzidine was added to 75 ml of deoxygenated polyphosphoric acid at 30° C. The mixture was gradually heated under a nitrogen atmosphere to 195° C over 6 hours and the homogeneous red solution was stirred at that temperature for ten hours. The product was obtained as a fine maroon precipitate upon pouring the reaction mixture slowly into 2 liters of well stirred methanol. The filtered product was thoroughly washed with boiling methanol and dried at 80° C and 0.01 mm Hg pressure for 12 hours to give 1.85 g of maroon solid representing a 96.8% yield. This polymer was soluble in methanesulfonic acid from which it would be reprecipitated by addition to an excess of methanol. The reprecipitated material had an intrinsic viscosity [η] of 0.85 as determined in methanesulfonic acid.

Analysis-Calc'd for $(C_{34}H_{14}N_6O_2)_n$: C, 75.82; H, 2.62; N, 15.60; Found: C, 74.53; H, 2.95; N, 14.69.

EXAMPLE III

Poly[(7,7'dioxo-[4,4'-bi-7H-benzimidazo[2,1-a]benzo[de][2,6]naphthyridine]-10,10'-diyl)oxy]

A mixture of 1.40 g (3.55 mmole) of 4,4',5,5'-tetracarboxy-8,8'-biquinoline dianhydride and 0.81 g (3.55 mmole) of 3,3',4,4'-tetraaminodiphenylether was added to 75 ml of deoxygenated polyphosphoric acid at 30° C. The mixture was gradually heated, under a nitrogen atmosphere, to 195° C over 6 hours and the homogeneous red solution was stirred at that temperature for ten hours. The product was isolated by pouring the cooled reaction mixture into 2 liters of well stirred methanol. The filtered product was thoroughly washed with boiling methanol and dried at 80° C and 0.01 mm Hg pressure for 10 hours to give 1.92 g of polymer representing a 98% yield. The polymer was purified by reprecipitation from methanesulfonic acid into methanol. The reprecipitated material had an intrinsic viscosity [η] of 0.75 as determined in methanesulfonic acid.

Analysis-Calc'd for $(C_{34}H_{14}N_6O_3)_n$: C, 73.64; H, 2.54; N, 15.15; Found: C, 72.75; H, 2.21; N, 14.75.

EXAMPLE IV

Poly[7,7'-dioxo[4,4'-bi-7H-benzimidazo[2,1-a]benzo[de][2,6]-naphthyridine]-10,10'-diyl)oxy-1,5-naphthalene-oxy]

A mixture of 0.719 g (2.14 mmole) of 4,4',5,5'-tetracarboxy-8,8'-biquinoline dianhydride and 0.85 g (2.14 mmole) of 1,5-bis(3,4-diaminophenoxy)naphthalene was added to 75 ml of deoxygenated polyphosphoric acid at 30° C. The mixture was gradually heated, under a nitrogen atmosphere, to 195° C over 6 hours and the homogeneous solution was stirred for ten hours. The product was obtained as a fine precipitate upon pouring the cooled reaction mixture into 2 liters of well stirred water. The filtered product was thoroughly washed with water, then boiling methanol and dried at 80° C and 0.01 mm Hg pressure for 12 hours to give a 1.46 g (98%) yield of polymer. The material was purified by reprecipitation from methanesulfonic acid into methanol. The reprecipitated material had an intrinsic viscosity [η] of 0.5 as determined in methanesulfonic acid.

Analysis-Calc'd for $(C_{44}H_{20}N_6O_4)$: C, 75.85; H, 2.89; N, 12.06; Found: C, 74.81; H, 3.21; N, 11.74.

EXAMPLE V

Poly[7,7'-dioxo[4,4'-bi-7H-benzimidazo[2,1-a]benzo[de][2,6]-naphthyridine]-10,10'-diyl)oxy-1,1'-biphenylene-oxy]

A mixture of 1.05 g (2.65 mmole) of 4,4',5,5'-tetracarboxy-8,8'-biquinoline dianhydride and 0.9 g (2.65 mmole) of 2,2'-bis(3,4-diaminophenoxy)biphenyl was added to 75 ml of deoxygenated polyphosphoric acid at 30° C. The mixture was gradually heated, under a nitrogen atmosphere, to 195° C over 6 hours and the homogeneous red solution was stirred at that temperature for 10 hours. The product was obtained as a fine red precipitate upon pouring the reaction mixture into 2 liters of well stirred methanol. The filtered product was thoroughly washed with boiling methanol and dried at 80° C and 0.01 mm Hg pressure for 12 hours to give a 1.85 g (97%) yield. The material was purified by reprecipitation from methanesulfonic acid into methanol. The purified polymer had an intrinsic viscosity [η] of 0.53 as determined in methanesulfonic acid.

Analysis-Calc'd for $(C_{46}H_{22}N_6O_4)_n$: C, 76.44; H, 3.06; N, 11.63; Found: C, 75.34; H, 3.56; N, 10.98.

Thermal gravimetric analysis of the polymers, as determined in the Chevenard Apparatus, showed that decomposition of the polymers commenced at 500° C in air. In a nitrogen atmosphere, weight loss did not occur until 600° C and amounted to only 25 percent at 900° C.

From the foregoing, it is seen that the polymers of this invention are thermally stable at elevated temperatures. This desirable property renders them particularly useful for high temperature applications encountered in aircraft and aerospace systems.

As will be evident to those skilled in the art, modifications of the present invention can be made in view of the foregoing disclosure without departing from the spirit and scope of the invention.

I claim

1. A thermally stable polymer consisting essentially of repeating units having the following formula:

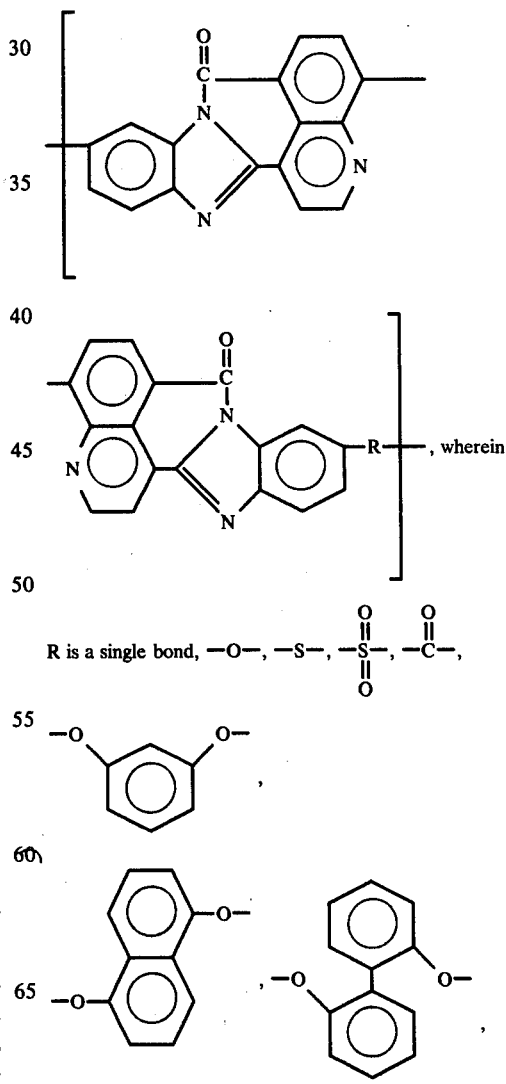

R is a single bond, —O—, —S—, $-\overset{\overset{O}{\|}}{\underset{\underset{O}{\|}}{S}}-$, $-\overset{\overset{O}{\|}}{C}-$, -continued

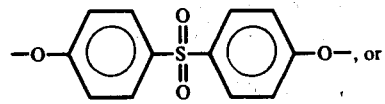, or

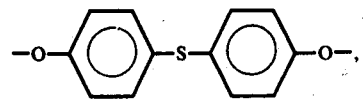,

The number of repeating units being such that the polymer has an intrinsic viscosity of about 0.10 to 1.5 as determined in methanesulfonic acid.

2. The thermally stable polymer according to claim 1 in which R is a single bond.

3. The thermally stable polymer according to claim 1 in which R is —O—.

4. The thermally stable polymer according to claim 1 in which R is

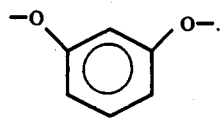

5. The thermally stable polymer according to claim 1 in which R is

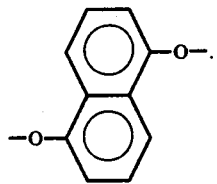

6. The thermally stable polymer according to claim 1 in which R is

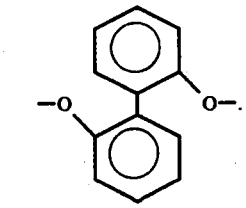

* * * * *